United States Patent Office 2,923,180
Patented Feb. 2, 1960

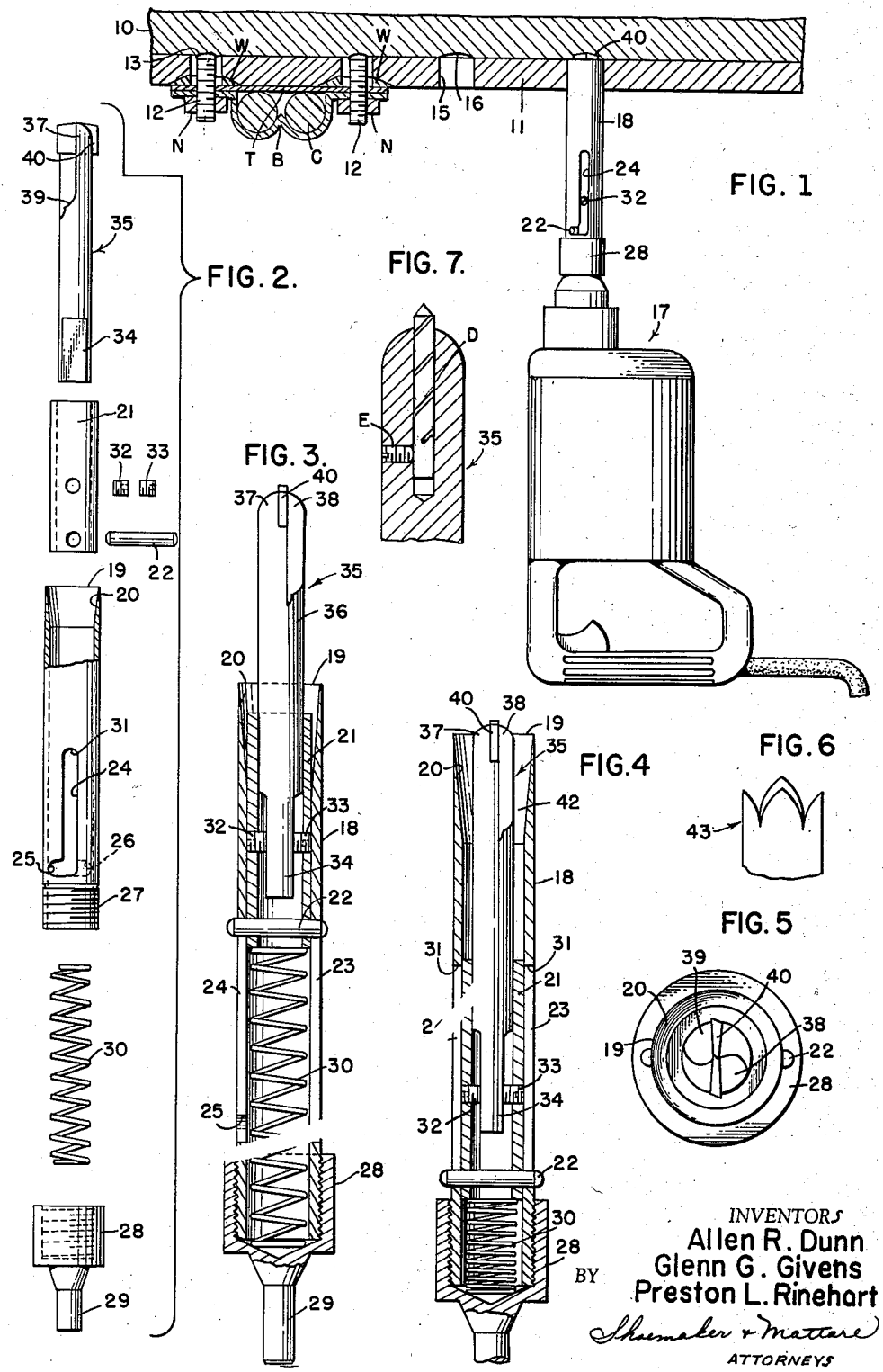

2,923,180
INSULATION CUTTING TOOL

Allen R. Dunn, Hampton, Glenn G. Givens, Newport News, and Preston L. Rinehart, Hampton, Va., assignors to Newport News Shipbuilding and Dry Dock Company, Newport News, Va., a corporation of Virginia Application December 14, 1956, Serial No. 628,399

7 Claims. (Cl. 77—69)

This invention relates to a method and a tool for preparing insulation or similar sheeting and underlying metallic wall portions for the reception of securing fastening studs which are to be welded to the stated underlying metallic wall portions and which studs are utilized for the purpose of securing or suspending cables, fixtures and the like.

It is frequently required, particularly in naval ships, to lay up sheets of insulating material, usually for the purpose of attaining thermal insulation, on the exposed inside metallic surfaces of various compartments, rooms and the like. It has heretofore been conventional practice to initially lay up the various cables, pipes, fixtures and the like and to then lay up the insulation sheets. Ordinarily, particularly in naval ships, the amount of cables, fixtures and the like which are ordinarily suspended, for example, overhead is considerable and it is an impossibility to lay out precisely beforehand just exactly where all of the securing brackets will be located for the installation of the various pipes, cables and fixtures which are necessary. As the individual crews install the various types of fixtures, electric cables or the like, they install the various necessary and required supporting brackets in a more or less helter skelter fashion due to the fact that they must lay them up in any available space which may be left. For example, the first crew that installs naturally installs their particular item in the easiest possible manner whereas the following crews must route the cables or the like along a path which, of course, will not interfere with those items previously laid up. It is for this reason that the exact placement of all the securing brackets cannot be predicted and as before stated the conventional method of fitting the ship out would be to first lay up the accessory items such as the cables and so forth and to then lay up the insulation sheets. The securing studs for the insulation sheets conventionally are provided with pointed tips and after they are welded in place, the insulation is forced into place and, being of soft material, is readily pierced by the pointed studs. Thereafter the studs, being threaded, are provided with the securing nuts and washers to hold the sheets in place and the studs are then cut off flush with the securing nuts. However, since the cables and the like have already been laid up, the sheets must be prepared to receive the various studs which secure the supporting brackets for these items and, of course, with actually laying the sheets up, all of the previously suspended cables, pipes and the like must be disconnected by removing all the supporting brackets therefor from the associated studs so that the insulation sheets can be laid up and thereafter all of the cables, pipes, etc. are then re-installed or re-secured by putting up their supporting brackets on the associated studs once again. It can be readily appreciated from this that it is a very difficult job to lay up the insulation sheets due to the limited space available and the great number of studs which will be present on the deck or the like which must penetrate through the insulation sheets so that the securing brackets may be re-assembled on the exposed free ends of the securing studs. Moreover, it frequently occurs that after most of the usual items and fixtures are installed, additional electrical lines, pipes or the like have to be installed and this poses an additional problem in that it would be impractical to again remove the complete insulation of the sheeting so as to expose the underlying metallic surface so that the securing studs can be welded in place and it is the usual practice in such cases to merely gouge out a hole through the insulation sheet at the various points where the securing studs are to be installed so as to expose the underlying metal and to permit the welding of the studs in place.

It is, therefore, a primary object of this invention to enable the insulation sheeting to be laid up first and to then permit the subsequent installation of the various items such as electrical cables, fixtures and the like and to achieve this in a minimum of time and at the least cost.

A further object of this invention is to provide a tool particularly adapted for cutting out the core through an insulation sheet so as to expose an underlying metallic surface to permit the welding of a securing stud in place without removing the insulation or disturbing its initial position in any manner.

A further object of the invention resides in a tool in conformity with the foregoing object which also prepares the underlying metallic surface for a welding operation by cleaning off the surface of the metal and removing paint or other foreign substances therefrom.

Another object of this invention is to provide a tool particularly adapted for the purposes above described which consists essentially of an outer cutting sleeve adapted to cut a plug of insulation and expose the metallic surface underlying a sheet of insulation and which also incorporates a spring urged cleaning tool disposed centrally of such sleeve and projecting normally therebeyond to bottom against the stated underlying metallic surface and perform a cutting or cleaning operation thereon to prepare such metallic surface for a subsequent welding operation.

Still another object of this invention is to provide a tool in conformity with the foregoing object wherein means is provided to lock the cutting member to the outer sleeve in a fully retracted position of the cutter member relative to the sleeve so that when the operation of the tool is completed, the same may be withdrawn with the cut plug of insulating material retained within the tool for subsequent expulsion thereby when the cutting member is released from its locked engagement with the sleeve and is permitted under the action of its biasing spring to assume its fully projected position.

With the above and other objects in view, the invention consists in the construction and novel combination and arrangement of parts hereinafter fully described, illustrated in the accompanying drawing and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a view partly in section showing the manner in which the tool is used and illustrating a securing or supporting stud in completely assembled relationship;

Fig. 2 is an exploded elevational view partly in section showing the component parts of the tool;

Fig. 3 is a longitudinal section of the tool showing the relationship of the component parts thereof wherein the cleaning or inner cutter element is in its fully projected position;

Fig. 4 is a view similar to Fig. 3 but showing the inner cleaning member in its fully retracted position;

Fig. 5 is an end view of the tool;
Fig. 6 is an elevational view of a modified form of the invention; and
Fig. 7 is a longitudinal section of the cutting end of the tool showing the use of a pilot drill.

Referring now more particularly to Fig. 1, the reference numeral 10 indicates a bulkhead, deck or similar metallic member as specifically related to naval vessels in particular, whereas the reference character 11 indicates a sheet or layer of insulating material which is associated with the member 10, usually for the purpose of providing thermal insulation although it is not uncommon to utilize such insulation also as in acoustical insulating element. Fig. 1 shows the manner in which these sheets are normally held in place and, as shown, the conventional practice utilizes securing studs 12 which are welded directly to the metallic member 10 and which penetrate the insulating sheet 11, the studs being threaded throughout at least a substantial portion of their length to receive the fastening or securing nuts N and which serve to hold the fastening brackets B in place. In the particular example shown, the bracket B serves to provide a securing point for a pair of electric cables C. Suitable washers W may be provided in association with each stud to provide a relatively large bearing area against the insulation, as is clearly shown, and it is preferred that a backing strap T be employed to isolate the cables C from direct contact with the sheet 11 in the region of the brackets B. The washers and/or backing strap also cover the holes cut in the insulating sheet to provide sealing of the hole.

The studs 12 are used to mount any necessary conduits, electrical cables or pipes, etc. and in such cases it is frequently necessary to place these additional studs in position after the sheet has been initially laid up and secured to the metal plate. Conventionally, when this occurs, it is more practical to simply gouge out a hole in the sheet and expose the underlying plate 10 and then clean the plate and weld the stud in place. It is then necessary, of course, to fill up the gouged out area of the sheet surrounding the stud since it usually is necessary to make quite a large opening in order to properly expose the metal plate 10 and permit the same to be cleaned so that the stud when it is welded to the plate achieves a good fusion therewith.

By utilizing the tool forming the subject matter of this invention and as illustrated in Fig. 1, a very neat and rapid installation of studs may be made at any time regardless of whether the insulating sheet is in place or not, the tool performing two basic functions, the boring or drilling of the insulating sheet so as to provide an access opening such as that indicated by the reference character 15 therethrough and to gouge out or drill a depression 16 in the underlying portion of the plate 10 so as to clean the same and prepare it for welding the stud in place. As can be seen in Fig. 1, the openings 15 produced by the tool are of slightly larger diameter than the studs 12 so that a conventional stud welding tool may be inserted through these holes and the studs welded in place as is shown.

The tool proper, as is shown most clearly in Figs. 2, 3 and 4 consists essentially of an outer cutting sleeve 18 which is provided at one end with a cutting edge 19 which may be conveniently formed by beveling the inner surface at the end of the tool as indicated by the reference character 20. The remainder of the inner surface of the sleeve 18 is of substantially uniform diameter and slidably receives therein a chuck sleeve 21 which is in the preferred embodiment of cylindrical configuration open at both ends and having a driving pin 22 projecting diametrically therethrough as is shown most clearly in Figs. 3 and 4, the opposite ends of the pin 22 projecting radially outwardly of the chuck sleeve 21 and through the elongate slots 23 and 24 which are formed in diametrically opposed portions of the outer cutting sleeve 18, see particularly Fig. 2. Each slot 23 and 24 terminates in an offset locking notch such as is indicated by the reference characters 25 and 26 in Fig. 2 adjacent the base end of the outer cutting sleeve 18, the purpose of which will be presently described.

The base portion of the outer cutting sleeve 18 is externally threaded as indicated by the reference character 27 and receives thereon a nut 28 to which is attached the axially projecting shank 29 whereby the tool may be chucked up into the aforementioned drill 17 to be driven thereby.

The chucking sleeve 21 is freely slidable within the outer sleeve 18 but nevertheless is rather snugly engaged thereby so as to be guided therewithin without appreciable radial clearance which would tend to permit the chucking sleeve to wobble within the outer sleeve. An elongate compression spring 30 is disposed within the outer sleeve 18 and bottoms within the aforementioned nut 28 with its opposite end bearing against the inner end of the chucking sleeve 21 to normally urge the chucking sleeve to the fully projected position shown in Fig. 3 wherein the pin 22 is engaged against the remote extremities 31 of the slots 23 and 24.

The chucking sleeve is provided with diametrically opposed tapped openings receiving a pair of radially inwardly projecting and diametrically opposed set screws 32 and 33. It is to be noted that the set screws 32 and 33 are accessible through the slots 23 and 24 when the chucking sleeve 21 is slid inwardly such as in a position as shown in Fig. 4 so that the two screws which would by either provided with Allen wrench recesses or slotted ends may be tightened against the flat shank 34 of the cleaning tool assembly indicated generally by the reference character 35.

The main body portion 36 of this tool member is of circular cross section and terminates in a rounded nose 37 having diametrically opposed cut away portions 38 and 39 and being slotted therebetween to receive carbide tips 40. The tips, of course, are suitably brazed or silver soldered in place.

From a study of Fig. 4, it will be clear that the proper position of the cleaning tool 35 in relation to the cutting sleeve 18 when the former is in its fully retracted position is such that the tips 40 project slightly beyond the cutting edge 19 of the outer sleeve so that when the cutting edge 19 is nearly or completely bottomed against the surface of the metal plate, the cutting tips 40 will, of necessity, have progressed into the metal plate sufficiently to properly clean the same and prepare the surface thereof for the subsequent welding operation of the stud.

As is shown most clearly in Fig. 7, there is provided an axially extending recess projecting inwardly from the tip end of the tool 35 and received therewithin is a small drill D, the tip of which projects slightly beyond the end of the body 35 and there is provided a tapped hole intersecting the bore receiving this drill and fitted with a set screw E engaging against the shank of the drill D and holding the same in place. The purpose of the drill D is to provide a centering device for the tool and prevent its wandering when the tool initially engages the metallic member 10.

In operation, after the tool has been chucked up, and the proper place for the stud has been located, the tool is engaged against the insulation with the parts in the relative positions as shown in Fig. 3. Of course, due to the fact that the outer sleeve is directly rotated by the drill through the medium of the shank 29 and associated nut 28 and due to the fact that the pin 22 projects through the slots 23 and 24, the entire assembly will be rotated and ordinarily the pressure of the tool against the insulation sheet will be sufficient to retract the inner cutting member 35 substantially its full extent within the outer sleeve 18, although as a practical matter the strength of the sleeve 18 is sufficient to maintain the inner member 35 away from its locked-up position so that the same cuts slightly in advance of the normal positions of the parts as shown in Fig. 4. However, when the tool has been advanced to a depth within the insulation material so that the drill D engages against the surface of the plate 10, the member 35 will be retracted further within the sleeve 18 until such point as the ends of the drive pin 22 are opposite the notches 25 and 26 and these notches extend in a direction opposite to each other so that the normal direction of rotation of the drill will advance the ends of the pins into these slots so as to lock the member 35 to the outer sleeve 18 and prevent axial relative movement between the same. Pressure is maintained on the drill 17 until the cutting tips 40 have penetrated a sufficient depth into the metal plate as to properly clean and prepare the surface thereof for the subsequent welding operation of the stud to the plate, such as, for example, is shown in Fig. 1. When the complete operation is finished, the tool is removed and a core of insulating material will be retained between the outer surface of the inner member 35 and the inner surface of the sleeve 18, this operation being indicated by the reference character 42 in Fig. 4. The pin 22 may then be grasped and the entire inner assembly rotated to release the pin from the notches 25 and 26 whereafter the spring 30 will bias the inner member 35 to its fully extended position as shown in Fig. 3 pushing the core of insulating material ahead of it.

In the modified form of the invention shown in Fig. 6, the reference numeral 43 indicates generally the cutting end of the outer sleeve of the tool which is formed identically with that described previously in connection with the element 18 in Figs. 1–5 with the exception that the cutting edge thereof is serrated as shown. The purpose of this construction is to prevent undue friction-generated heat which with some types of insulating material will cause burning of the same such as will build up a layer of fused insulating material on the sleeve cutting edge, thus impairing the efficiency thereof.

We claim:

1. A tool for preparing a sheet of insulating material and an underlying metal plate for the reception of a support stud adapted to be metallically bonded to the metal plate, comprising an outer cutting sleeve having an axial shank at one end for connection to a rotary driving tool and having a cutting edge at its opposite end, an elongate inner cutting member concentrically disposed within said sleeve and axially slidable therein between a fully retracted position in which the outer free end of said inner cutting member is disposed just beyond said cutting edge of the sleeve and a fully projected position in which said outer end of the inner cutting member is disposed a substantial distance beyond said cutting edge of the sleeve, said outer end of the inner member having a cutting element thereon providing a diametrical cutting edge for cleaning a circular area of the metal plate, means carried by said inner cutting member within and operatively connected with said sleeve to limit relative rotation therebetween while permitting the aforementioned axial movement between its retracted and projected positions, said means also being effective to releasably interlock the inner and outer members with the inner cutting member in its retracted position, and spring means adapted to move the inner cutting member to said fully projected position.

2. A tool for preparing a sheet of insulating material and an underlying metal plate for the reception of a support stud adapted to be welded to the metal plate, comprising a tubular cutting sleeve having a shank at one end for connection to a rotary driving tool and having an annular cutting edge at its opposite end for cutting through the associated insulating material, an inner cutting member concentrically disposed within said sleeve and axially slidable therein, said inner cutting member having a cutting element at one end positioned just beyond the cutting edge of said sleeve when the inner cutting member is in its fully retracted position in the cutting sleeve and disposed a substantial distance beyond the cutting edge of said sleeve when the inner cutting member is in its fully projected position from the cutting sleeve, means normally biasing said inner cutting member to its said fully projected position, means limiting a relative rotational movement between the inner cutting member and said sleeve while permitting the aforementioned axial movement of the inner cutting member between its retracted and projected positions, the last mentioned means being also effective to releasably interlock the inner cutting member to said sleeve with the former in its fully retracted position, and spring means adapted to move the inner cutting member to said fully projected position.

3. A tool of the character described comprising an outer tubular sleeve of circular cross section having a driving shank projecting from one end and having the inner surface thereof adjacent and extending to the opposite end tapered to provide a sharp annular cutting edge at such opposite end with the remainder of the inner surface of said sleeve being of substantially uniform diameter, an open ended chucking sleeve slidably but snugly received within the outer sleeve, a pin projecting diametrically through the inner end of said chucking sleeve and through the outer sleeve with the outer sleeve being provided with diametrically opposed longitudinally elongate slots receiving the opposite ends of said pin, a spring within said outer sleeve engaging the inner end of said chucking sleeve to normally bias the same such that said pin engages the remote ends of said slots, an inner cutting member including a shank fixed within said chucking sleeve with the main body portion of the inner cutting member projecting axially therefrom to terminate at its free end in a cutting tip with the main body portion of such tool being spaced from the inner surface of said outer sleeve to define an insulation plug receiving chamber therewith, the ends of said slots adjacent said driving shank for the sleeve being circumferentially enlarged to present locking notches to receive said ends of said pin to hold said chucking sleeve and the inner cutting member in a fully retracted position with said cutting tip of the inner member exposed just beyond the cutting edge of said sleeve.

4. A tool of the character described comprising an elongate tubular cutting sleeve of circular cross section, a shank integral with and extending axially from one end of the sleeve for attachment to a power tool, the opposite end of the sleeve having a cutting edge, the cutting sleeve having a pair of oppositely positioned longitudinal slots therein in the portion thereof remote from the cutting edge and terminating short of the rear end of the sleeve, an open ended chucking sleeve within the cutting sleeve for reciprocal movement therein, guide means carried by the inner end of the chucking sleeve and slidably engaging in said slots to permit axial movement of the chucking sleeve while preventing rotational movement thereof in the cutting sleeve, an elongate cutting member having a portion of one end extending into the outer end of the chucking sleeve and having cutting means at its other end, securing elements threaded into apertures in the wall of the chucking sleeve and engaging said end portion of the cutting member and securing the cutting member and chucking sleeve together, and a compression spring within the inner end portion of the cutting sleeve and engaging the chucking sleeve and urging the latter and the cutting member to the full extent of its outward movement, which outward movement is limited by said guide means in said slots, and said chucking sleeve and cutting member when operatively joined together by the securing elements forming a unit having a length such that said cutting means will project only slightly beyond the cutting edge of the cutting sleeve when the unit is fully retracted in the cutting sleeve against the compressed resistance of said spring.

5. The invention according to claim 4, with means for locking the said unit to the cutting sleeve when the unit is in said said fully retracted position, 6. The invention according to claim 4, wherein said slots terminate in offset locking notches at their inner ends positioned to have said guide means enter therein to lock the unit to the cutting sleeve when the unit is moved to said fully retracted position while the cutting sleeve and unit are being rotated in one direction.

7. A tool of the character described comprising an elongate tubular cutting sleeve of circular cross section, a shank integral with and extending axially from one end of the sleeve for attachment to a power tool, the opposite end of the sleeve having a cutting edge, the cutting sleeve having a pair of oppositely positioned longitudinal slots therein in the portion thereof remote from the cutting edge and terminating short of the rear end of the sleeve, an open ended chucking sleeve within the cutting sleeve for reciprocal movement therein, guide means carried by the inner end of the chucking sleeve and slidably engaging in said slots to permit axial movement of the chucking sleeve while preventing rotational movement thereof in the cutting sleeve, an elongate cutting member having a portion of one end extending into the outer end of the chucking sleeve and having cutting means at its other end, securing elements threaded into apertures in the wall of the chucking sleeve and engaging said end portion of the cutting member and securing the cutting member and chucking sleeve together, and a compression spring within the inner end portion of the cutting sleeve and engaging the chucking sleeve and urging the latter and the cutting member to the full extent of its outward movement, which outward movement is limited by said guide means in said slots, and said chucking sleeve and cutting member when operatively joined together by the securing elements forming a unit having a length such that said cutting means will project only slightly beyond the cutting edge of the cutting sleeve when the unit is fully retracted in the cutting sleeve against the compressed resistance of said spring, said securing elements being positioned to be accessible for removal through said slots when said unit is retracted to a prescribed extent in the cutting sleeve.

References Cited in the file of this patent

UNITED STATES PATENTS

| | | |
|---|---|---|
| 58,924 | Webster | Oct. 16, 1866 |
| 2,038,668 | Newson | Apr. 28, 1936 |
| 2,096,495 | Hogg | Oct. 19, 1937 |
| 2,591,847 | Masini | Apr. 8, 1952 |
| 2,628,512 | Lankford | Feb. 17, 1953 |
| 2,754,864 | Elsy | July 17, 1956 |